June 26, 1945.   R. U. FITTING, JR., ET AL   2,379,138
ANNULAR FLOW MEASURING DEVICE
Filed Jan. 11, 1943

Inventors: Ralph U. Fitting, Jr.
Mark H. McKinsey
By their Attorney:

Patented June 26, 1945

2,379,138

UNITED STATES PATENT OFFICE 2,379,138

ANNULAR FLOW MEASURING DEVICE

Ralph U. Fitting, Jr., and Mark H. McKinsey, Midland, Tex., assignors to Shell Development Company, San Francisco, Calif., a corporation of Delaware Application January 11, 1943, Serial No. 472,074

11 Claims. (Cl. 73—155)

The present invention relates to methods of measuring fluid flow rates in boreholes and pertains more particularly to methods and apparatus for measuring the rate or volume of fluid flow through the annular space between the tubing string and the walls of the borehole or the casing.

When injecting fluids such as acids, plugging materials, etc., into a well it is highly advantageous to be able to determine at which depths and at what rate the fluid enters the earth formation in order that the desired control of placement of fluid may be obtained.

It is of equal importance to determine the exact level or levels at which any liquid may enter the borehole from the formation.

It is therefore an object of this invention to provide a method and apparatus for obtaining at the surface of the well indications of the rate of fluid flow at various levels through the annular space between a pipe string and the walls of the borehole or the casing.

It is a further object of this invention to provide a method and apparatus for determining the point or points at which a fluid flow takes place between the borehole and the formation surrounding said borehole.

It is still another object of this invention to provide an apparatus for carrying out any of the foregoing objects in a simple and inexpensive manner.

Further objects and advantages will be apparent from the following description, taken in reference to the accompanying drawing, wherein.

Figures 1, 2, 3, 4:
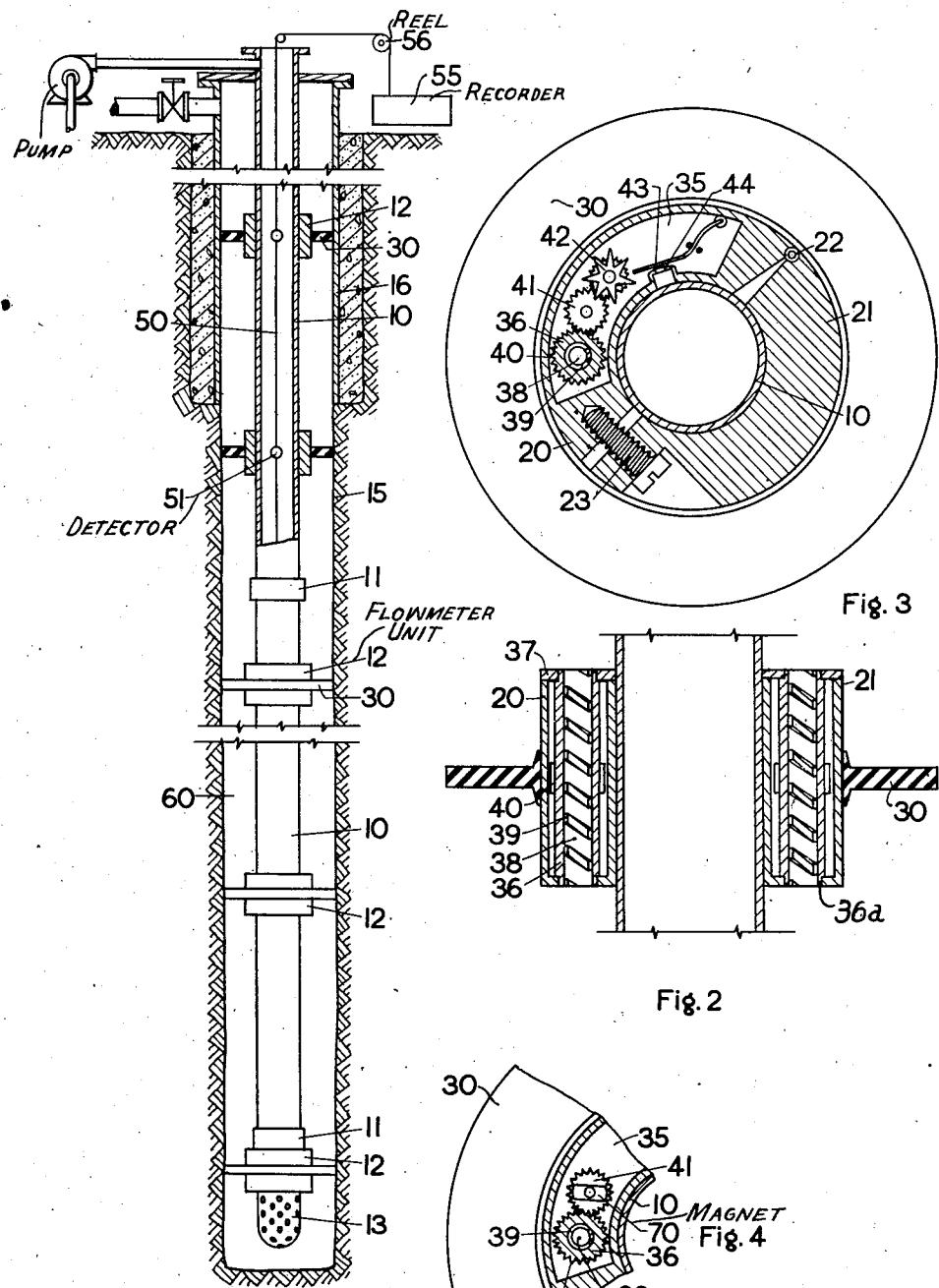
Figure 1 is a vertical sectional view of a well containing the present flow measuring apparatus in operative position.
Figure 2 is a view in vertical cross-section of a flowmeter unit having two rotors.
Figure 3 is a view in horizontal cross-section of a flowmeter unit similar to that of Figure 2 but having only one rotor.
Figure 4 is a fragmentary cross-section similar to Figure 3 and showing a variation in the structure of the present invention.

Briefly, the present invention comprises a system wherein pulsations or vibrations are generated in the borehole by means of a series of spaced flowmeter units carried on a pipe string. Said pulses are preferably mechanical vibrations which are translated into electric impulses by means of a series of similarly spaced detector units carried on a conducting cable adapted to be suspended within the pipe string. Indicating means electrically connected with said detectors through said conducting cable are used at the well surface to observe or record the indications of the rate of fluid flow originating in the flowmeter units.

Referring to Figures 1 to 3 of the drawing, a preferred embodiment of the present invention comprises a tubing string 10 having couplings 11 and carrying a series of flowmeter units 12 spaced along the outside of the string 10. The lower end of the tubing string 10 may be suitably provided with a perforated bull plug 13, if desired. The tubing string 10 is lowered into the borehole 15, the upper part of which is shown with casing 16 cemented in place. It is to be understood that the flowmeter units may likewise be lowered into a borehole on other suitable pipe strings, such as a casing or drill strings.

The flowmeter units 12 may be of any suitable type, adapted to generate a mechanical vibration or pulsation in the borehole fluid, or to emit a clicking sound or other audible or detectable vibratory signal. The flowmeter units 12 may be attached to the pipe string in any suitable manner and in any desired space relationship. A preferred embodiment of a flowmeter unit 12, as shown in Figures 2 and 3, comprises a pair of semi-annular members 20 and 21 adapted to be clamped about the tubing string 10 by means of a hinge connection 22 and screw bolt 23 joining the annular members 20 and 21.

Surrounding and projecting from the annular members 20 and 21 is a packer, or preferably a relatively thin annular skirt or collar 30 of resilient material, such as copper, rubber (natural or synthetic), rubberized or elastomer-impregnated canvas or other woven fabric, metal-reinforced woven fabric, etc. The annular resilient skirt 30 extends laterally from the annular members 20 and 21 to the walls of the borehole 15 or casing 16 and thereby forms a barrier directing the flow of fluid in the annular space through the flowmeter unit 12.

Arranged in a chamber 35 within the semi-annular member 20 is the flow-responsive signal-emitting means, which preferably comprises a tubular turbine rotor 36 journaled into the bottom of member 20 and into the cover plate 37 for chamber 35. Fluid passing through the bore 38 of the rotor 36 and impinging against the vanes 39 therein causes the rotor 36 to rotate. In meshing engagement with a gear 40 on the outer surface of the tubular rotor 36 is a gear 41 which is adapted to operate a spur gear or notched wheel 42 against a resilient clicker 43, such as a leaf spring or other suitable clapper, which may be arranged with a resonance box 44 or the like. If desired, the revolution of the rotor 36 may be arranged to operate any other desired signal emitting means through suitable gearing.

Also, if desired, several ports may be provided in the semi-annular members 20 and 21 to insure that all or most of the fluid will pass through the flow meter unit. Further, the rotor 36 may be rotatable in both directions, or, two rotors, each being rotatable only in one direction and opposite to each other, may be used as shown in Figure 2 at 36 and 36a.

A conductor cable carrying signal detecting devices 51 in a spaced relationship similar to the spacing of the flow-responsive signal-emitting units is used as a communication channel to transmit these signals to the surface. Preferably, the conductor cable is an insulated, acid-resistant multiple conductor electric cable 50, and the detectors 51 are of any desired type, for example, shockproof electrical microphones, piezoelectric microphones, or any other detectors such as used, for example, in seismic or acoustical logging of boreholes. By using flowmeters and detectors operating each on a different distinctive frequency in combination with a suitable filtering system at the surface, a single conductor cable may likewise be used as a single or common channel for the signals of the flowmeters. Each detector is connected by means of the cable 50 to a suitable indicating or recording device 55 at the surface through, if desired, one or more amplification stages.

In operation, the tubing string 10 with the flowmeter units 12 attached thereto is lowered into the desired position within the borehole 15, and the cable 50 carrying the microphones 51 is positioned within the tubing string 10 with the microphones 51 opposite the flowmeter units 12. The exact level at which each of the flowmeters and detectors is positioned is accurately determined from the length of the tubing lowered into the well, and from the readings of the reeling device 56 over which the cable supporting the detectors may be passed into the well. Fluid, such as acid in an acidizing operation, is forced down through the tubing string 10, out through the perforated bull plug 13 on the lower end thereof, and up through the annular space 60 between the tubing string 10 and the walls of the borehole 15. Due to the barrier formed by each laterally extending skirt 30 at least a portion of the upwardly flowing fluid is directed through the tubular rotor 36, which is thereby rotated by the action of the flowing fluid against the internal rotor vanes 39. By the rotation of gear 40 on the outside of the rotor 36, and gear 41, or other desired intermediate gears, the notched wheel 42 is caused to turn against the spring leaf clicker 43. Since the rotor 36 revolves at a rate which is a function of the rate of fluid flow therethrough, the rate of clicking caused by the notched wheel 42 and clicker 43, which is actuated by the rotor 36, is proportional to the fluid flow rate.

The clicking of each of the flowmeter units 12 is transmitted through the well fluid to the adjacent detector, wherein it is converted to electric impulses, which are transmitted through the cable 50, to the surface, where they are suitably noted, indicated or recorded. The rate of clicking may, for example, be recorded at the surface on a graphic record plotted against time by use of a series of pens or perforators actuated by electromagnets or by separate recording galvanometers for each detector, in a manner well known in the art of well-logging.

It is preferable that the calibration of the clicker or flowmeter units 12 be effected immediately after lowering the tubing string 10 carrying the flowmeter units 12 into the borehole. This calibration may be carried out by pumping fluid through the tubing string 10 and securing a free return of fluid to the surface at several rates of flow and recording the rates of clicking under conditions where each flowmeter unit 12 is subjected to the same flow rate. Calibration may likewise be effected by pumping a liquid through the annulus around the tubing and securing flow to the surface through the tubing while recording the rates of clicking.

It will be seen that from the records of a series of spaced flowmeter units 12 the rate of fluid flow through the annular space 60 is obtained for several levels in the borehole and that the difference in flow rate between levels represents the amount of fluid passing into the formation between these levels.

Instead of generating mechanical pulses, the apparatus of the present invention may be adapted to generate pulses of other types, for example, electric or magnetic pulses. Thus, as shown in Figure 4, the gear 40, instead of actuating the spur gear 42, may be used to rotate a small permanent magnet 70 mounted on the gear 41, and the magnetic flux variations caused by said rotation may be detected by a suitable pick-up coil detector 51 lowered into the tubing 10. It is obvious that in such case the tubing 10 or portions thereof, as well collars, gears and housings therefor, should preferably be made of a non-magnetic material, such as fiber or plastics, aluminum, brass, etc.

The method and apparatus of the present invention has many advantages and applications. Thus, for example, in the acidization of oil wells, once the rates of flow at various levels are accurately determined, it is possible to control more effectively the acidization process by applying proper pressures and varying the rates at which the acid or the back-pressure oil is injected. Likewise, the relative permeabilities of the various sections of the producing formation can be readily ascertained and the danger of injecting acid into undesirable strata, such as gas bearing layers, thereby giving rise to an increased gas-oil ratio, can be eliminated or minimized. On flowing a well, it can be determined from relative flow rates at the various levels which portion of the producing strata or pay horizon would produce oil at any flowing bottom hole pressure. By obtaining the rate of flow from a portion of the producing formation at several different differential pressures, the productive index and permeability of each portion of the formation may be determined.

A particular advantage of the apparatus resides in the simplicity and ruggedness of the flowmeter units 12 carried by the pipe string 10, whereby they may be left in the hole, and thus a round-trip of the tubing to retrieve the flow-measuring equipment following acidization is avoided with a considerable saving of time.

Although the present invention has been described in relation to the preferred embodiment, which includes a plurality of spaced flowmeter units and detectors, a single flowmeter unit together with a detector or plurality of flowmeter units and a single detector may be used while retaining some of the advantages and features of the invention.

We claim as our invention:

1. In a system for determining the rate of fluid flow in the annular space between the walls of a borehole and a pipe string lowered therein, a plurality of vertically spaced packing means carried by said pipe string exteriorly thereof, said means being adapted to seal off said annular space at vertically spaced levels, a passage through each of said packing means, metering means carried by said pipe exteriorly thereof adjacent each of said packing means, each of said metering means being actuated by the fluid flow through each of said passages to generate in the borehole fluid a mechanical vibration as a function of the rate of said flow, an insulated conductor cable adapted to be lowered into said pipe string, a plurality of spaced detectors supported by said cable and electrically connected thereto, each of said detectors being adapted for positioning at the level of one of said metering means, said detectors being adapted to translate said mechanical vibrations into electrical impulses, and indicating means electrically connected with said cable at the surface, said indicating means being adapted to indicate separately the impulses from each of said detectors.

2. In a system for determining the rate of fluid flow in the annular space between the walls of a borehole and a pipe string lowered therein, a plurality of vertically spaced metering means carried by said pipe exteriorly thereof, each of said metering means having a fluid passage therethrough and means responsive to fluid flow through said passage to generate mechanical vibrations as a function of the rate of said flow, packing means carried by each of said metering means and adapted to seal off said annular space at the level of said metering means, whereby fluid flow through said annular space is caused to flow through said passage in said metering means, a plurality of vertically-spaced detectors adapted for positioning at the respective levels of said metering means, said detectors being adapted to translate said vibrations into electrical impulses, indicating means at the surface adapted to indicate separately the impulses from each of said detectors, and an insulated conductor cable supporting said detectors and electrically connecting said detectors to said indicating means.

3. In a system for determining the rate of fluid flow in the annular space between the walls of a borehole and a pipe string lowered therein, a plurality of vertically spaced metering means carried by said pipe exteriorly thereof, each of said metering means having a fluid passage therethrough and means responsive to fluid flow through said passage to generate mechanical vibrations as a function of the rate of said flow, said flow responsive means comprising a vaned rotor in said passage adapted to be rotated by the flow of fluid through said passage, a vibratory member, and gear means in cooperative engagement with said rotor for actuating said vibratory member, a plurality of vertically-spaced detectors adapted for positioning at the respective levels of said metering means, said detectors being adapted to translate said vibrations into electrical impulses, indicating means at the surface adapted to indicate separately the impulses from each of said detectors, and an insulated conductor cable supporting said detectors and electrically connecting said detectors to said indicating means.

4. In a system for determining the rate of fluid flow in the annular space between the walls of a borehole and a pipe string lowered therein, a plurality of vertically spaced metering means carried by said pipe exteriorly thereof, each of said metering means having a fluid passage therethrough and means responsive to fluid flow through said passage to generate mechanical vibrations as a function of the rate of said flow, said flow responsive means comprising a vaned rotor in said passage adapted to be rotated by the flow of fluid through said passage, a vibratory member, and gear means in cooperative engagement with said rotor for actuating said vibratory member, packing means carried by each of said metering means and adapted to seal off said annular space at the level of said metering means, whereby fluid flow through said annular space is caused to flow through said passage in said metering means, a plurality of vertically-spaced detectors adapted for positioning at the respective levels of said metering means, said detectors being adapted to translate said vibrations into electrical impulses, indicating means at the surface adapted to indicate separately the impulses from each of said detectors, and an insulated conductor cable supporting said detectors and electrically connecting said detectors to said indicating means.

5. In a system for measuring the fluid flow occurring between the formation and a borehole containing a column of liquid, means comprising a pipe string adapted to confine an inner column of liquid centrally of an outer column formed between said string and the walls of the borehole, said two columns being in communication solely at the bottom of said string, pumping means adapted to cause a liquid flow in opposite directions in said two columns, flow restricting means exteriorly affixed to said string, said flow restricting means comprising a metering element adapted to generate pulsations of a frequency proportional to the rate of flow in the outer column of liquid, cable means adapted to be lowered within said pipe string, detector means supported by said cable means and adapted to translate said pulsations into electrical impulses, and indicating means at the surface electrically connected with said cable means adapted to indicate said impulses.

6. In a system for measuring the fluid flow occurring between the formation and a borehole containing a column of liquid, means comprising a pipe string adapted to confine an inner column of liquid centrally of an outer column formed between said string and the walls of the borehole, said two columns being in communication solely at the bottom of said string, pumping means adapted to cause a liquid flow in opposite directions in said two columns, a plurality of flow restricting means vertically spaced from each other and exteriorly affixed to said string whereby said outer column is divided into a plurality of vertical sections, each of said flow restricting means comprising a metering element adapted to generate pulsations of a frequency proportional to the rate of liquid flow in the outer column at the level of each of said flow restricting means, cable means adapted to be lowered into said pipe string, detector means supported by said cable means and adapted to translate said pulsations into electrical impulses for each of said levels, and indicating means at the surface electrically connected with said cable means adapted to indicate said impulses.

7. In a system for measuring the fluid flow occurring between the formation and a borehole, said borehole being provided with an installation comprising a pipe string lowered thereinto, whereby inner and outer concentric liquid columns are defined within the borehole, the inner column being confined within said pipe string and the outer column being confined within the annular space between said string and the walls of the borehole, and pressure means adapted to produce a liquid flow in a vertical direction in said outer column, the combination comprising means including a metering element adapted to generate pulsations of a frequency proportional to the rate of flow in the outer liquid column, detector means adapted to be positioned within said string at substantially the level of said metering means, said detector means being adapted to translate said pulsations into electrical impulses, means adapted to convey these impulses to the surface, and indicating means at the surface adapted to indicate said impulses.

8. In a system for measuring the fluid flow occurring between the formation and a borehole, said borehole being provided with an installation comprising a pipe string lowered thereinto, whereby inner and outer concentric liquid columns are defined within the well, the inner column being confined within said pipe string and the outer column being confined within the annular space between said string and the walls of the borehole, and pressure means adapted to produce a liquid flow in a vertical direction in said outer column, the combination comprising means including a metering element exteriorly affixed to said pipe string and adapted to generate pulsations of a frequency proportional to the rate of flow in the outer liquid column, cable means adapted to be lowered within said pipe string, detector means supported by said cable means at substantially the level of said metering element and adapted to translate said pulsations into electrical impulses, and indicating means at the surface electrically connected with said cable means and adapted to indicate said impulses.

9. In a system for measuring the fluid flow occurring between the formation and a borehole, said borehole being provided with an installation comprising a pipe string lowered thereinto, whereby inner and outer concentric liquid columns are defined within the borehole, the inner column being confined within said pipe string and the outer column being confined within the annular space between said string and the walls of the borehole, and pressure means adapted to produce a liquid flow in a vertical direction in said outer column, the combination comprising a plurality of means each including a metering element exteriorly affixed to said pipe string at a plurality of predetermined levels within the borehole and adapted to generate pulsations of a frequency proportional to the rate of flow in the outer liquid column at each of said levels, cable means adapted to be lowered within said pipe string, a plurality of detector means supported by said cable means at substantially the level of each of said metering elements and adapted to translate said pulsations into electrical impulses, and indicating means at the surface electrically connected with said cable means and adapted to indicate said impulses.

10. In a method for measuring the fluid flow occurring between the formation and a borehole, said borehole containing a pipe string lowered thereinto, whereby two concentric liquid columns are defined within the borehole, the inner column being confined within said pipe string and the outer column being confined within the annular space between said pipe string and the walls of the borehole, the steps of producing a liquid flow in a vertical direction in said outer column, causing said flow in the outer column to generate pulsations of a frequency proportional to the rate of said flow at a predetermined level, detecting said pulsations within the inner column at said level, transmitting said pulsations to the surface and indicating said pulsations.

11. In a method for measuring the fluid flow occurring between the formation and a borehole, said borehole containing a pipe string lowered thereinto, whereby two concentric liquid columns are defined within the borehole, the inner column being confined within said pipe string and the outer column being confined within the annular space between said pipe string and the walls of the borehole, the steps of producing a liquid flow in a vertical direction in said outer column, causing said flow to generate pulsations of distinctive frequencies at a plurality of predetermined levels, said pulsation frequencies being subject to variations proportional to liquid flow rate variations at each of said levels, detecting said pulsations within the inner column substantially at each of said predetermined levels, transmitting said pulsations to the surface, and separately indicating the pulsations generated at each of said levels.

RALPH U. FITTING, Jr.
MARK H. McKINSEY.